May 23, 1961  J. S. HILL  2,984,868
METHOD OF MAKING FUSED QUARTZ FIBERS
Filed March 20, 1958

INVENTOR
JAMES S. HILL

BY
ATTORNEYS

United States Patent Office 2,984,868
Patented May 23, 1961

2,984,868
METHOD OF MAKING FUSED QUARTZ FIBERS

James S. Hill, Cranford, N.J., assignor, by mesne assignments, to Engelhard Industries, Inc., Newark, N.J., a corporation of Delaware Filed Mar. 20, 1958, Ser. No. 722,820

1 Claim. (Cl. 18—47.3)

The present invention deals with fused quartz fibers and more particularly with the method of making fused quartz fibers.

There are several known methods for making fused quartz fibers among which are the method of melting quartz powder between a pair of electrodes to form a fused quartz globule and drawing continuous filaments from the globule, the method of spinning silicic acid compounds of lower melting point than pure fused quartz and subsequently removing the compound impurities whereby a fiber of substantially pure fused quartz is obtained and the method of spinning fused quartz filaments and gas blasting the extruded filaments at right angles to obtain fused quartz fibers.

These methods are all complicated and difficult to perform because they necessitate the extremely high working temperatures of above 1700° C.

Fibers of glasses of lower melting point than fused quartz are comparatively easy to make in view of the lower melting points. Consequently, while it is possible to produce glass fibers by economical methods, such methods as known are not applicable to fused quartz. For example, it is possible to form glass fibers by introducing a glass body to a high velocity-high temperature gas flame whereby the flame blast draws out the glass into fine fibers from the glass body which has been softened by the heat of the flame. While this method is operative for glasses of lower melting point than fused quartz, it is quite difficult to employ in connection with fused quartz since the glass blast, while operative to form fibers of glass, is not sufficient to form fused quartz fibers. In the case of fused quartz, higher temperatures and higher pressures are necessary, but these conditions are difficult to attain economically by known methods.

Figure 1:
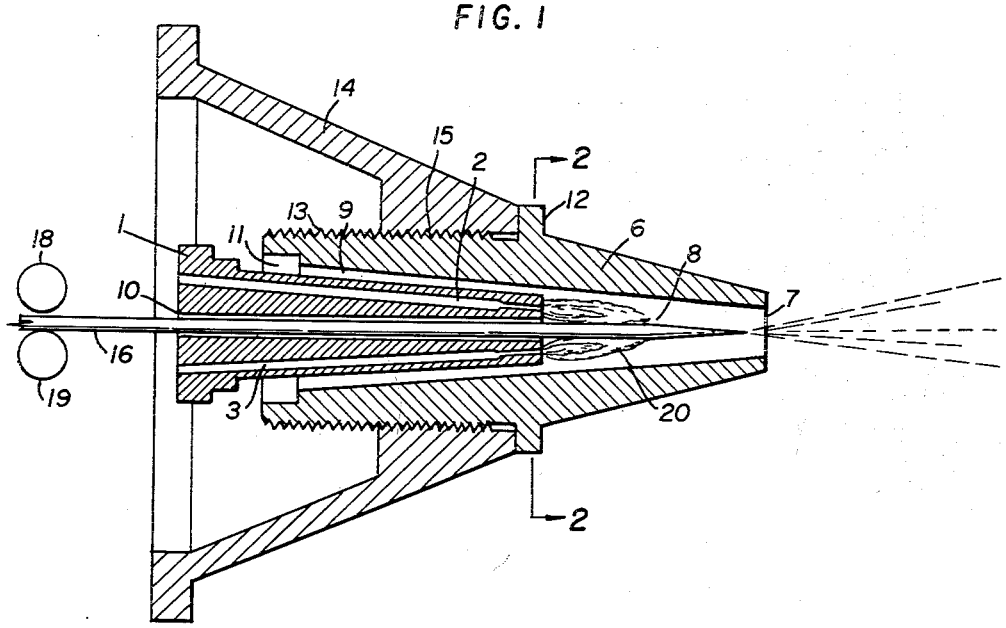
Figure 2:
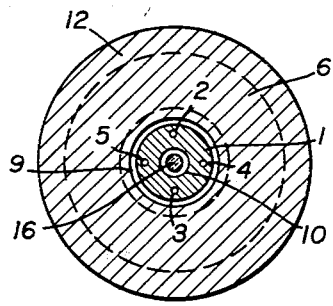
Figure 3:
Figure 4:
Figure 5:
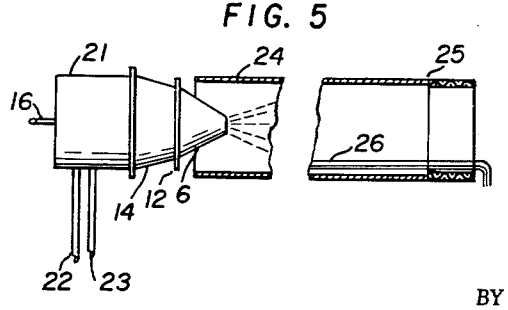

It is an object of the present invention to provide fused quartz fibers. It is another object of the invention to provide extremely fine fused quartz fibers at a high rate by an economical method. It is a further object of the invention to provide fused quartz fibers of substantial lengths. Other objects and advantages of the invention will become apparent from the description hereinafter following and the drawings forming a part hereof, in which:

Figure 1 illustrates a cross-sectional view of an apparatus for forming fused quartz fibers according to the invention, Figure 2 illustrates a cross-sectional view along lines 2—2 of Figure 1, Figure 3 illustrates a cross-sectional view of a fused quartz rod employed in the method of the invention, Figure 4 illustrates a cross-sectional view of a fused quartz tube employed in the method of the invention, and Figure 5 is a partly diagrammatic and partly cross-sectional view of a modification of the apparatus.

The invention deals with a method of producing fused quartz fibers by introducing a fused quartz rod or tube into a high temperature gas flame at a temperature above 1700° C., confining the flame and its attendant high temperature along an end portion of the rod or tube, melting the quartz by means of the flame, and simultaneously passing a high velocity gas other than the flame gas over the molten fused quartz, whereby the other gas, e.g. high pressure air, draws out the molten fused quartz into fine fibers and expels the fibers outwardly of the confined melting or softening zone.

Referring to Figures 1 and 2, the apparatus for making fused quartz fibers according to the method of the invention comprises an elongated inner gas nozzle 1 having at least one and preferably a plurality of longitudinal gas conduits 2, 3, 4 and 5 formed therethrough. Alternatively, the conduits 2, 3, 4 and 5 may comprise functionally equivalent separate tubes. An outer longitudinal gas nozzle 6 envelopes the outlets of the inner nozzles with the outlet 7 extending forwardly of the inner nozzle outlets forming a combustion chamber 8 between the outlets of the inner and outer nozzles. The inner and outer nozzles are spaced from each other forming a peripheral gas passage 9 about the inner nozzle 1. The outlet openings of the inner nozzle are spaced from each other normal to the axis of conduit 5 with the said axis being between a pair of the openings, and the openings being directed to converge toward the axis of the outer nozzle 6. An elongated passage 10 is provided substantially coaxially of the outer nozzle 6 between the gas conduits 2, 3, 4 and 5 with the gas conduit 9 being substantially concentric with the passage 10. The bore of outer conduit 6 is tapered from its inlet 11 to its outlet 7. The outer nozzle 6 is provided with an external flange 12 between the inlet 11 and outlet 7, and the surface of the nozzle 6 is threaded as at 13 between the inlet 11 and flange 12. A substantially cone-shaped hollow member 14 is provided with internal threads near its apex, as at 15 and is thereby threadedly engaged with the threads 13 of conduit or nozzle 6.

A fused quart rod 16 or tube 17 as shown by Figures 3 and 4 is positioned through the coaxial passage and fed therethrough by feeding means, e.g. drive rolls 18 and 19.

In operation, and according to the method of the invention, a source of combustible gas, e.g. oxy-acetylene or oxy-hydrogen, is connected to the nozzle 1, whereby the gas, under substantial pressure and velocity passes through the gas conduits 2, 3, 4 and 5, is ignited in the combustion chamber 8, and forms a high temperature flame 20 directed onto an end portion of the quartz rod or tube in the combustion chamber 8. The flame or blast 20 has a temperature higher than the melting temperature of the rod 16 or tube 17.

Simultaneously with the passing of combustible gas through the inner nozzle, another gas, e.g. air, under high pressure, e.g. from about twenty to about seventy pounds pressure, is introduced into the gas cone 14 wherefrom it passes through the conduit 9 enveloping and confining and accelerating the gas flame blast about the surface of the rod 16 or tube 17 within the combustion chamber forming a concentric flame sleeve over the quartz rod. The combustible gas, in view of the extremely high melting point of the quartz, is ordinarily not of sufficient velocity to draw fibers out of the softened end of the quartz rod. However, supplemented by the high pressure air sleeve, extremely fine quartz fibers are formed by the action of this second gas sleeve. Consequently, the high pressure gas or air sleeve is the fiber drawing gas.

The air sleeve, or second gas sleeve, is essential in the method of the invention and performs three critical functions. It confines the gas flame substantially in the form of a sleeve over the surface of the quartz rod, it is the fiber forming or fiber drawing force for accelerating the gas flame blast and drawing fibers of substantial lengths from the molten quartz, and it acts as an insulator between the extremely hot flame sleeve 20 and the outer nozzle 6, whereby otherwise the nozzle forming the combustion chamber 8 would melt due to the high temperature of the flame.

Heretofore, e.g. in the production of glass fibers, the fibers were softened or melted externally of the gas nozzles, and in view of the low heat retaining capacity of the quartz, only comparatively short glass fibers could be formed. However, according to the invention, the molten quartz is confined to the combustion chamber under high temperatures and in view of the flame sleeve formation, longer fibers are produced and are otherwise regulated by the velocity of the air sleeve.

While the formation of the second gas sleeve is sufficient to perform the invention, by the use of the quartz tube according to Figure 4, air under pressure is introduced through the quartz tube 17 forming an air or gas core which is heated during passage through the tube and which increased the fiber forming capacity of the apparatus illustrated.

Figure 5 illustrates a modification of the invention. Combustible gas is fed through a housing 21 to the nozzle 1 in known manner by means of a hose 22 and high pressure air is likewise fed through the housing 21, by means of hose 23, to the air cone 14 and subsequently through the passage 9. The modification comprises inserting or directing the nozzle into a long tunnel or tube 24 having a diameter substantially greater than the nozzle 6, for example a diameter of about 6 inches to about 12 inches and a length of from about 10 feet to about 15 feet with the exit or end portion of the tunnel comprising a tubular screen 25 which acts as a gas velocity relief and which also permits the escape of carbon particles from the burned gases. It has been found that the provision of the tunnel or tube 24 permits the fibers to attain substantially longer lengths. The fibers formed by the method of the invention deposit themselves along the length of the tunnel 24, for example as at 26, and measurements of the fibers show length varying from about 6 inches to about 6 feet with the longer fibers predominating.

While the invention is described particularly as a method for making fused quartz fibers, other heat softenable fiber forming materials may be employed, for example glasses of various compositions, colors and melting points.

Various modifications of the invention are contemplated within the scope of the appended claim.

What is claimed is:

The method of making fibers from an elongated fused quartz member, comprising passing a gas flame at a temperature above 1700° C. into an open-ended combustion conduit, feeding said member into the flame, passing a high pressure gas sleeve at a pressure of from twenty to seventy pounds per square inch over the flame and directing the flame over an end portion of the member during its passage through the combustion conduit, melting the end of the member by the heat of the flame, drawing the molten end into fibers and expelling the fibers from the said end by means of the velocity of the high pressure gas, and passing the expelled fibers into a tunnel having a larger diameter and greater length than the combustion conduit.

References Cited in the file of this patent

UNITED STATES PATENTS

| | | |
|---|---|---|
| 1,617,166 | Schoop | Feb. 8, 1927 |
| 2,067,982 | Poe | Jan. 19, 1937 |
| 2,175,225 | Slayter | Oct. 10, 1939 |
| 2,269,459 | Kleist | Jan. 13, 1942 |
| 2,318,244 | McClure | May 4, 1943 |
| 2,411,660 | Manning | Nov. 26, 1946 |
| 2,530,345 | Watts | Nov. 14, 1950 |
| 2,578,101 | Stalego | Dec. 11, 1951 |

FOREIGN PATENTS

| | | |
|---|---|---|
| 524,749 | Belgium | Dec. 31, 1953 |
| 610,845 | Great Britain | Oct. 21, 1948 |